US008515096B2

(12) United States Patent
Seltzer et al.

(10) Patent No.: US 8,515,096 B2
(45) Date of Patent: Aug. 20, 2013

(54) INCORPORATING PRIOR KNOWLEDGE INTO INDEPENDENT COMPONENT ANALYSIS

(75) Inventors: Michael L. Seltzer, Seattle, WA (US); Graham Taylor, Toronto (CA); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1126 days.

(21) Appl. No.: 12/141,103

(22) Filed: Jun. 18, 2008

(65) Prior Publication Data

US 2009/0316928 A1 Dec. 24, 2009

(51) Int. Cl.
*H04B 15/00* (2006.01)

(52) U.S. Cl.
USPC .......... 381/94.1

(58) Field of Classification Search
USPC .......... 381/94.1
See application file for complete search history.

(56) References Cited

U.S. PATENT DOCUMENTS

| | | | | |
|---|---|---|---|---|
| 6,321,200 | B1 | 11/2001 | Casey | |
| 6,622,117 | B2 | 9/2003 | Deligne et al. | |
| 6,799,170 | B2 | 9/2004 | Lee et al. | |
| 6,879,952 | B2 * | 4/2005 | Acero et al. | 704/222 |
| 7,020,294 | B2 | 3/2006 | Lee et al. | |
| 7,047,189 | B2 | 5/2006 | Acero et al. | |
| 7,099,821 | B2 | 8/2006 | Visser et al. | |
| 2007/0025562 | A1 | 2/2007 | Zalewski et al. | |
| 2007/0189427 | A1 | 8/2007 | Haghighat | |
| 2008/0027714 | A1 | 1/2008 | Hiekata et al. | |

OTHER PUBLICATIONS

Gauvain, J.-L., et al., "Maximum a Posteriori Estimation of Multivariate Gaussian Mixture Obsrvations of Markov Chains",Apr. 1994, IEEE Trans. on Speech and Audio Proc., vol. 2 No. 2, p. 291-8.*

Anemuller, et al., "Adaptive Separation of Acoustic Sources for Anechoic Conditions: A Constrained Frequency Domain Approach", Date: May 27, 2002, pp. 1-27, vol. 39, Issue 1-2, Publisher: Elsevier Science Publishers B. V. Amsterdam, The Netherlands.

Pearlmutter, et al., "Monaural Source Separation using Spectral Cues", Date: 2004, pp. 1-8, vol. 3195/2004, Publisher. Springer Berlin/Heidelberg.

Westner, et al., "Applying Blind Source Separation and Deconvolution to Real-World Acoustic Environments", Proceedings 106th Audio Engineering Society (AES) Convention, May 1999. 10 Pages.

(Continued)

*Primary Examiner* — Howard Weiss
(74) *Attorney, Agent, or Firm* — Microsoft Corporation

(57) ABSTRACT

The quality of sound recorded from a plurality of people speaking at the same time is improved by incorporating prior knowledge into an independent component analysis (ICA) separating algorithm. More particularly, prior knowledge is defined as a probability distribution according to some prior situation (e.g., prior distribution of people in a room). A mixture of sounds (e.g., mixture of voices) from a plurality of sources (e.g., people) captured by one or more recording devices (e.g., microphones) is separated into individual components (e.g., individual voices from respective people) by applying an maximum a posteriori (MAP) ICA algorithm which incorporates prior knowledge of the respective sources (e.g., location of sources) directly into the MAP ICA algorithm thereby allowing recovery of independent underlying sounds associated with individual sources from the mixture. Therefore, incorporating prior knowledge into an ICA algorithm provides sound quality substantially equal to existing ICA systems, but at reduced computational complexity.

20 Claims, 9 Drawing Sheets

(56) References Cited

OTHER PUBLICATIONS

Amari, et al., "Multichannel Blind Deconvolution and Equalization Using the Natural Gradient", Signal Processing Advances in Wireless Communications, 1997 First IEEE Signal Processing Workshop, Date: Apr. 1997, pp. 101-104, Issue: 16-18.
Matsuoka, et al., "Minimal Distortion Principle for Blind Separation", SICE 2002. Proceedings of the 41st SICE Annual Conference, Date: Aug. 2002, pp. 1-6, vol. 4, Issue: 5-7.
Douglas, et al., "Convolutive Blind Separation of Speech Mixtures Using the Natural Gradient", Date: 2003, pp. 65-78, vol. 39, Issue 1-2, Publisher: Elsevier Science Publishers B. V. Amsterdam, The Netherlands.
Kurita, et al., "Evaluation of Blind Signal Separation Method Using Directivity Pattern under Reverberant Conditions", Acoustics, Speech, and Signal Processing, 2000. ICASSP apos;00. Proceedings. 2000 IEEE International Conference, Date: 2000, pp. 3140-3143, vol. 5.
Ikram, et al., "A Beamforming Approach to Permutation Alignment for Multichannel Frequency-Domain Blind Speech Separation", Acoustics, Speech, and Signal Processing, 2002. Proceedings. (ICASSP apos;02). IEEE International Conference, Date: 2002, pp. I-881-I-884, vol. 1, 2002.
Araki, et al., "Equivalence between Frequency Domain Blind Source Separation and Frequency Domain Adaptive Beamforming for Convolutive Mixtures", EURASIP Journal on Applied Signal Processing, Date: 2003, pp. 1157-1166, vol. 2003, Issue 1, Publisher: Hindawi Publishing Corp. New York, United States.
Anemiller, et al., "Amplitude Modulation Decorrelation for Convolutive Blind Source Separation", Proceeding of the second international workshop on independent component analysis and blind signal separation, Date: 2000, 6 Pages.
Murata, et al., "An Approach to Blind Source Separation Based on Temporal Structure of Speech Signals", Date: 1998, pp. 1-31.
Asano, et al., "A Combined Approach of Array Processing and Independent Component Analysis for Blind Separation of Acoustic Signals", Speech and Audio Processing, IEEE Transactions, Date: May 2003, pp. 2729-2732, vol. 11, Issue: 3.
Sawada, et al., "Polar Coordinate Based Nonlinear Function for Frequency Domain Blind Source Separation", Acoustics, Speech, and Signal Processing, 2002. Proceedings. (ICASSP '02). IEEE International Conference, Date: 2002, vol. 1, pp. I-1001-I-1004.
Parra, et al., "Convolutive Blind Separation of Non-Stationary Sources", Speech and Audio Processing, IEEE Transactions, Date: May 2000, pp. 320-327, vol. 8, Issue: 3.
Schobben, et al., "A Frequency Domain Blind Signal Separation Method Based on Decorrelation", Signal Processing, IEEE Transactions on [see also Acoustics, Speech, and Signal Processing, IEEE Transactions], Date: Aug. 2002, pp. 1855-1865, vol. 50, Issue: 8.
Back, et al., "Blind Deconvolution of Signals Using a Complex Recurrent Network", Neural Networks for Signal Processing [1994] IV. Proceedings of the 1994 IEEE Workshop, Date: Sep. 1994, pp. 565-574.
Lambert, et al., "Blind Separation of Multiple Speakers in a Multipath Environment", Acoustics, Speech, and Signal Processing, 1997. ICASSP-97., 1997 IEEE International Conference, Date: Apr. 1997, pp. 423-426, vol. 1, Issue: 21-24.
Lee, et al., "Blind Source Separation of Real World Signals", Date: Jun. 1997, pp. 1-6, vol. 4, Issue: 9-12.
Joho, et al., "Frequency Domain Realization of a Multichannel Blind Deconvolution Algorithm Based on the Natural Gradient", Date: Apr. 4-6, 2003, pp. 543-548.
Buchner, et al., "A Generalization of a Class of Blind Source Separation Algorithms for Convolutive Mixtures", Date: Apr. 1-4, 2003, pp. 1-6.
Winter, et al., "Geometrical Understanding of the PCA Subspace Method for Overdetermined Blind Source Separation", Acoustics, Speech, and Signal Processing, 2003. Proceedings. (ICASSP apos;03). 2003 IEEE International Conference, Date: Apr. 2003, pp. II-769-II-772, vol. 2, Issue: 6-10.
Bell, et al., "An Information-Maximization Approach to Blind Separation and Blind Deconvolution", Date: Nov. 1995, pp. 1129-1159, vol. 7, Issue 6.
Amari Shun-Ichi, "Natural Gradient Works Efficiently in Learning", Date: Feb. 1998, pp. 1-29, vol. 10, Issue: 2, Publisher: MIT Press Cambridge, MA, USA.
Hyvärinen, Aapo, "Fast and Robust Fixed-Point Algorithm for Independent Component Analysis", Date: May 1999, pp. 1-16, vol. 10, Issue: 3.
Cardoso, et al., "Blind Beamforming for Nongaussian Signals", Radar and Signal Processing, IEE Proceedings F, Date: Dec. 1993, pp. 1-17, vol. 140, Issue: 6.
Van Veen, et al., "Beamforming: A Versatile Approach to Spatial Filtering", pp. 1-24, ASSP Magazine, IEEE [see also IEEE Signal Processing Magazine], Date: Apr. 1988, pp. 4-24, vol. 5, Issue: 2.
Sawada, et al., "Convolutive Blind Source Separation for More than Two Sources in the Frequency Domain", Acoustics, Speech, and Signal Processing, 2004. Proceedings. (ICASSP '04). IEEE International Conference, Date: May 17-21, 2004, pp. iii-885-iii-888, vol. 3.
Sawada, et al., "A Robust Approach to the Permutation Problem of Frequency-Domain Blind Source Separation", Acoustics, Speech, and Signal Processing, 2003. Proceedings. (ICASSP apos;03). 2003 IEEE International Conference, Date: Apr. 2003, pp. V-381-V-384, vol. 5, Issue: 6-10.
Hyvärinen, et al., "Independent Component Analysis: Algorithms and Applications", Date: 2000, pp. 1-31, vol. 13, Issue: 4-5, Publisher. Elsevier Science Ltd. Oxford, UK.
Pearlmutter, et al., "Maximum Likelihood Blind Source Separation: A Context-Sensitive Generalization of ICA", 1996. 7 Pages.
Parra, et al., "Geometric Source Separation: Merging Convolutive Source Separation with Geometric Beamforming", Date: Sep. 2002, pp. 352-362, vol. 10, Issue: 6.
Attias Hagai, "Source Separation with a Sensor Array Using Graphical Models and Subband Filtering", NIPS 2002. pp. 1205-1212.
Araki, et al., "The Fundamental Limitation of Frequency Domain Blind Source Separation for Convolutive Mixtures of Speech", Date: Mar. 2003, pp. 132-137, vol. 11, Issue: 2.
Allen, et al., "Image Method for Efficiently Simulating Small-Room Acoustics", Date: Apr. 1979, pp. 943-950.
"Unsupervised Adaptive Filtering" vol. I: Blind Source Separation, Simon Haykin, 2000, A Wiley-Interscience Publication, John Wiley & Sons, Inc. 16 pgs.
"Independent Component Analysis—Theory and Applications", Te-Won Lee, Published 1998, Kluwer Academic Publishers, Abstract only, 2 pgs.
"Independent Component Analysis", A. Hyvarinin, J. Karhunen and E. Oja, 2001, John Wiley & Sons, found in the Internet at: http://research.ics.aalto.fi/ica/book/, 1 pg.
A Method of Blind Separation for Convolved Non-Stationary Signals:, Mitsuru Kawamoto, Kiyotoshi Matsuoka and Noboru Ohnishi, 1998, Neurocomput, vol. 22, Abstract only, 1 pg.
"Blind Separation of Convolved Mixtures in the Frequency Domain", Paris Smaragdis, 1998, Neurocomput, vol. 22, 8 pgs.
"A Neural Net for Blind Separation of Nonstationary Signals", Kiyotoshi Matsuoka, Masahiro Ohoya and Mitsuru Kawamoto, Neural Networks, vol. 8, No. 3, 1995, Abstract only, 1 pg.
"Array Geometry Arrangement for Frequency Domain Blind Source Separation", Ryo Mukai, Hiroshi Sawada, Sebastien De La Kethulle De Ryhove, Shoko Araki and Shoji Makino, International Workshop on Acoustic Echo and Noise Control, Sep. 2003, Kyoto, Japan, 4 pgs.
"Matrix Algebra From a Statistician's Perspective", David A. Harville, First Edition 1997, taken from the Internet at: http://www.springer.com/?SGWID=0-102-24-0-0&searchType=EASY_CDA&queryText=Matrix+Algebra+from+a+Statistician%27s+Perspective, Abstract only, 2 pgs.
"Frequency-Domain Blind Source Separation", Hiroshi Sawada, Ryo Mukai, Shoko Araki, and Shoji Makino, Speech Enhancement, Signals and Communication Technology, 2005, Abstract only, 1 pg.
"Superdirective Microphone Arrays", J. Bitzer and K. U. Simmer, in Microphone Arrays, Springer, Berlin, Heidelberg, New York, May 2001, Abstract only, 1 pg.

* cited by examiner

INCORPORATING PRIOR KNOWLEDGE INTO INDEPENDENT COMPONENT ANALYSIS

BACKGROUND

In recent history, advances in technology have caused the world to become increasingly integrated and globalized. Many companies are now global entities comprising offices and manufacturing sites geographically dispersed throughout the world. With such an integrated, yet geographically diverse, world people often need to communicate with other parties who are located far away. In order to facilitate such communication teleconferencing and video conferencing are widely used. Teleconferencing connects two or more parties over an audio network. Video conferencing further includes a camera and a video monitor allowing the parties to converse while viewing video images of each other.

Teleconferencing and videoconferencing systems are often used during meetings. During meetings situations often occur in which numerous people using a single teleconferencing device (e.g., a single phone) are talking over each other in a single room. In such situations the sound that is captured (e.g., received) by one or more microphone(s) of the teleconferencing device is a mixture of a plurality of voices and reverberating sounds from around the room. Blind Signal Separation (BSS) relates to the task of separating signals (e.g., sounds) when only their mixtures are observed (e.g., captured). BSS has diverse applications in many fields including vision research, brain imaging, and telecommunications. Of particular interest to this disclosure, in telecommunications BSS can be used to improve the sound quality of captured sound in digital communication such as teleconferencing, voice over IP, computer as a phone, and speech recognition.

Recently, Independent Component Analysis (ICA) has become a popular method of performing BSS. ICA is a computational method for separating a mixture of signals captured (e.g., received) from the plurality of sources into individual components associated with respective sources. For example, in telecommunications, ICA algorithms are designed to receive a mixture of sound (e.g., mixture of voices) output by a plurality of sources (e.g., people) from one or more recording devices (e.g., microphones) dispersed throughout a room (e.g., in the middle of a table) and unmix the captured mixture of sound to recover sound from individual sources without having any information of who the sources are or where they are located.

More particularly, ICA is a form of BSS that supposes a mutual statistical independence of the source signals (e.g., people's voices). When used in a telecommunication system, an ICA algorithm is performed independent of assumptions regarding the room or people using the system. Instead, an ICA algorithm utilizes a simple statistical model to manipulate captured signals so that statistically what comes out of each microphone is a signal that is independent from the signals coming from other microphones.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A sound signal comprising a mixture of voices (e.g., from a plurality of people speaking at the same time) captured (e.g., received) by one or more microphones is separated by a maximum a posteriori (MAP) ICA algorithm utilizing prior knowledge thereby providing a sound quality substantially equal to existing ICA systems, but at a reduced computational complexity.

More particularly, a mixture of signals (e.g., mixture of human speech) from a plurality of sources (e.g., people) captured (e.g., received) by one or more recording devices (e.g., microphones) is separated into individual components (e.g., individual voices from respective people) by applying an ICA algorithm. The ICA algorithm incorporates prior knowledge, defined according to a probability distribution that describes the respective sources (e.g., the location of the sources), directly into the ICA algorithm in a structured manner thereby allowing recovery of independent underlying signals associated with individual sources from the mixture.

Essentially, a prior knowledge model (e.g., a prior distribution) is defined comprising information pertaining to a prior probability distribution of sources (e.g., people) at a prior time. Sound signals captured from a plurality of sources are then sampled and represented as a vector according to a statistical model. The signals captured by a microphone are equal to the vector multiplied by a mixing matrix. A maximum a posteriori estimate of the inverse of the mixing matrix (called the unmixing matrix) is formulated (e.g., as a log-likelihood equation) incorporating prior knowledge of a prior probability distribution in a structured manner. The MAP estimate of the unmixing matrix is then enhanced. Enhancement is performed by applying an optimization algorithm that results in an enhanced unmixing matrix that can be used to determine individual sources from a captured source signal. Therefore, prior knowledge incorporated into the algorithm allows the source to be determined using the ICA algorithm thereby avoiding a post algorithm processing step.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
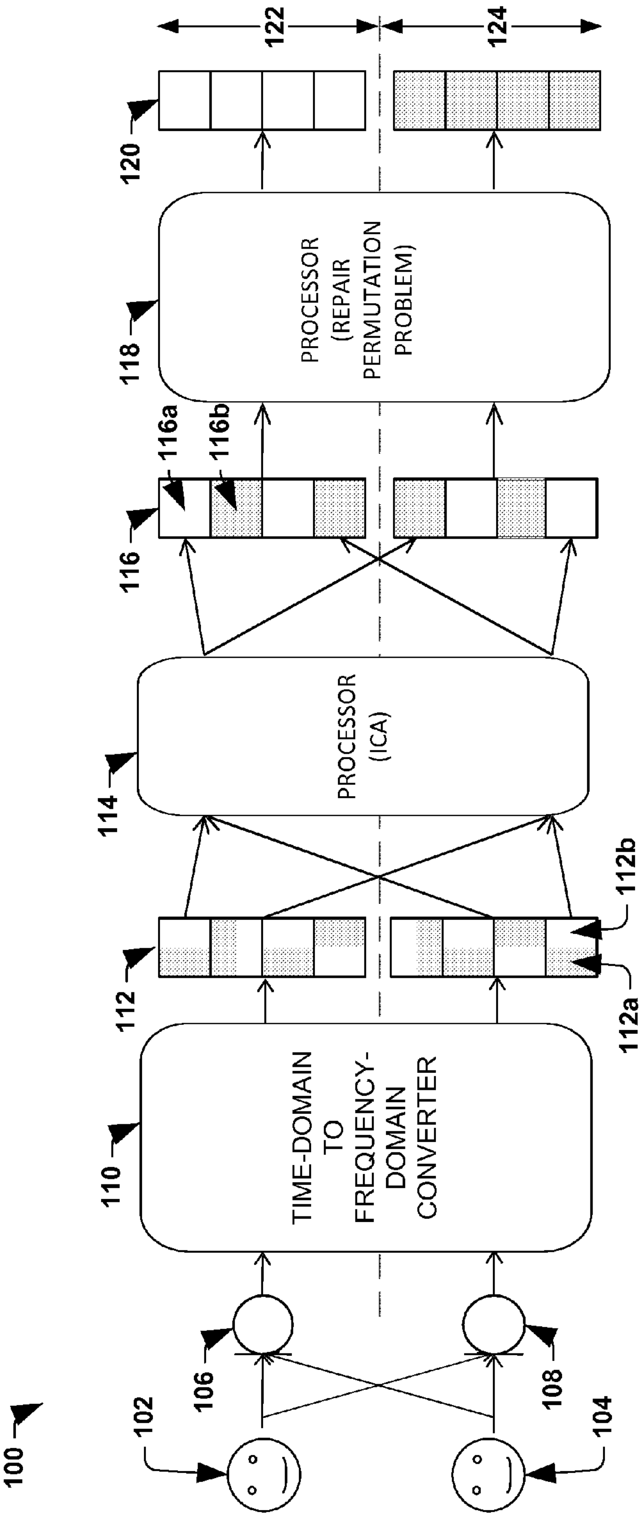
FIG. 1 (Prior Art)
FIG. 1 illustrates a block diagram according to a prior art Independent Component Analysis (ICA) algorithm.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

While the method and systems provided herein are often described in relation to sound signals it will be appreciated that they can be applied to a wide range of mixed signals. For example, the methods and system provided herein may be used to perform maximum a posteriori ICA for diverse applications comprising vision research, brain imaging, MRI, biomedical signal processing, etc.

FIG. 1 shows a block diagram 100 of a system configured to perform an ICA algorithm. The ideal output of such an ICA algorithm is one in which respective channels 122 or 124 comprise a sound signal only from a single source 102 or 104 (e.g., person). Unfortunately, the computations of ICA algorithms become complicated when dealing with a large number of sources or when recording devices (e.g., microphones) capture noises in addition to the speaker's immediate voice (e.g., reverberations of talker's voices reflecting off walls). One solution for reducing the complexity of ICA algorithm calculations is to work in the frequency domain. As shown in FIG. 1 a first source 102 and a second source 104 output sound captured (e.g., received) by a first recording device 106 and a second recording device 108. When both the first and second source, 102 and 104, are outputting sound at the same time, both the first recording devices 106 and the second recording devices 108 receive a mixture of sound from the first source 102 and the second source 104 thereby reducing the quality of the recorded sound. The sound signal is converted from the time domain to the frequency domain by a time-domain to frequency-domain converter 110. The time-domain to frequency-domain converter 110 segments the captured sound signal into a plurality of frequency bins 112. The frequency bins may be stored in a memory array, for example. Respective frequency bins may comprise a mixture of sounds from the first source (e.g., denoted in FIG. 1 as white sections of respective frequency bins 112*a*) and second source (e.g., denoted in FIG. 1 as gray sections of respective frequency bins 112*b*). However, since a single bin comprises a relatively small amount of data, unmixing sounds from the first and second sources, 102 and 104, is easier since respective frequency bins can be unmixed independent of other frequency bins. Unfortunately, in the frequency domain, for any current ICA algorithm performed by the dynamic processor 114, there is no guarantee that different frequency bins from a common source will be associated with the same recording device.

As shown in FIG. 1, when output from a dynamic processing unit (dynamic processor) 114 performing an ICA algorithm, respective frequency bins associated with a given source (e.g., first source 102 or second source 104) may to go to a different channels, 122 or 124, thereby causing respective channels, 122 or 124, to have a mixture of frequency bins comprising sound signals from the first source (white) and the second source (gray). For example, in the first channel 122 a first frequency bin 116*a* may comprise a first speaker's voice (shown in white), but a second frequency bin 116*b* may comprise the second speaker's voice (shown in gray). As is well known in the art, this is known as the "the permutation problem" and results in low sound quality (e.g., distortion). Some ICA systems 100 are configured to perform a post processing repair step after a dynamic processor 114 performs an ICA algorithm to fix the permutation problem. For example, a post processor 118 may perform a repair step using attributes (e.g., direction of arrival) to unmix the frequency bins 116 after the signal has been separated. However, such post processing repair steps are computationally intense and undesirable. Therefore, in the field of ICA there is a need for a method to prevent the permutation problem.

The techniques and systems, provided herein, relate to a method of performing an ICA algorithm comprising prior knowledge of the unmixing process (e.g., the location of the sources) which does not suffer from the permutation problem. More particularly, a mixture of sounds from a plurality of sources (e.g., human speech) captured (e.g., received) by a recording device are separated into individual signals by applying a maximum a posteriori (MAP) ICA algorithm which incorporates prior knowledge of respective sources (e.g., the location of the sources) directly into the ICA algorithm in a structured manner. Incorporating prior knowledge into an ICA algorithm results in an MAP ICA algorithm that does not experience the permutation problem and thereby allows recovery of independent underlying sounds from the mixture without post processing computation (e.g., a post processing repair step). Therefore, a sound quality on-par with existing ICA systems is provided while avoiding an expensive post-processing step.

Figure 2:
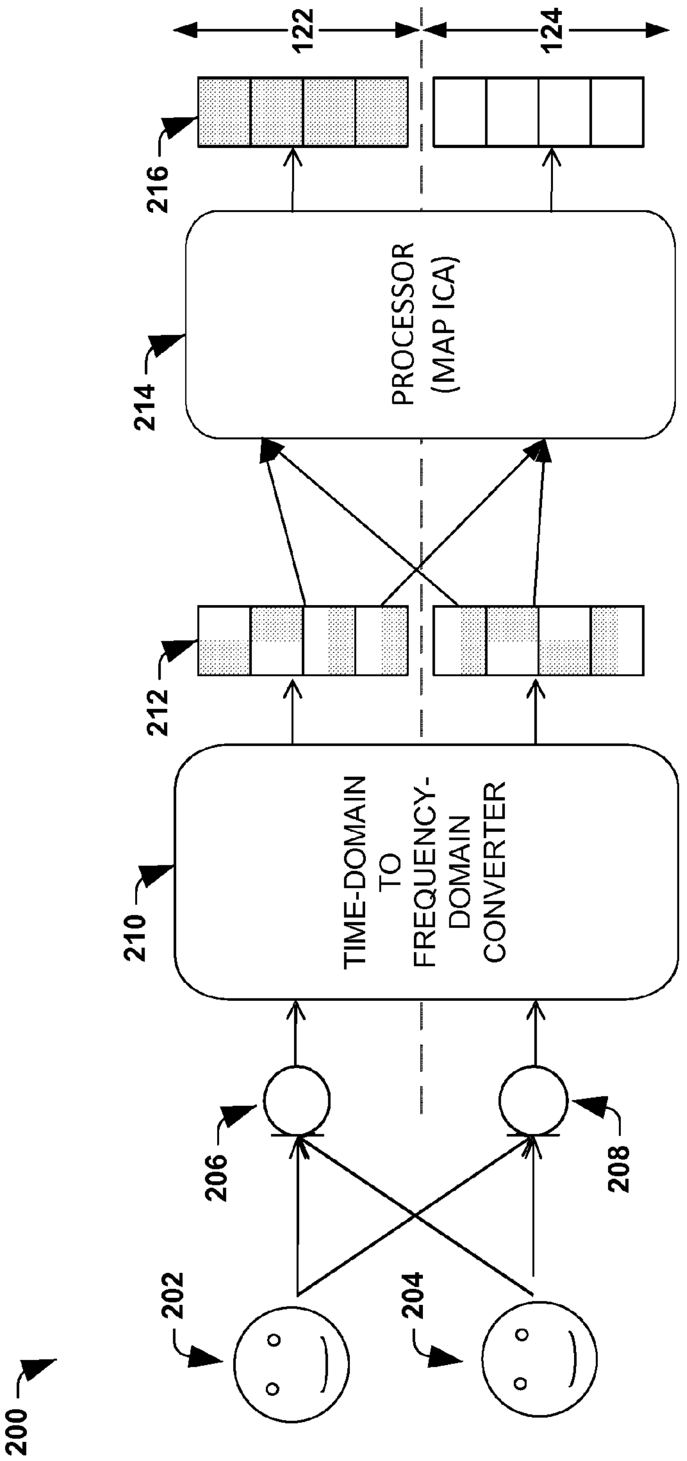
FIG. 2 Illustrates a block diagram of an ICA algorithm as presented herein.

FIG. 2 shows a block diagram 200 of an ICA system configured to perform MAP ICA (e.g., an ICA algorithm depending on prior knowledge) without requiring a post processing step to fix the permutation problem. A first source 202 and a second source 204 output sound signals captured by a first recording device 206 and a second recording device 208. When both the first and second source, 202 and 204, are outputting sound at the same time, both the first recording device 206 and the second recording device 208 receive a mixture of sound from the first source 202 and the second source 204 thereby reducing the quality of the recorded sound. The captured sound signals are converted from the time domain to the frequency domain by a time-domain to frequency-domain converter 210. The time-domain to frequency-domain converter 210 segments the sound signal into a plurality of frequency bins 212. Respective frequency bins 212 comprise a mixture of sound from the first channel (shown in grey) and sound from the second channel (shown in white). A dynamic processor 214 performs a MAP ICA algorithm, comprising prior knowledge of the sources, on a mixture of sound stored in respective frequency bins 212 of the first channel 122 and second channel 124. The MAP ICA algorithm separates the mixture of sound and provides a sound signals from a single source to respective frequency bins 216 in the first channel 122 and the second channel 124. For example, the MAP ICA algorithm performed by dynamic processor 214 would ensure that the first channel 122 only has sound signals from a first source 202 and the second channel 124 only has sound from a second source 204. Therefore, the ICA system of FIG. 2 improves the sound quality of a captured signal without requiring a computationally intensive post processing step.

While it will be appreciated that a MAP ICA algorithm as presented herein may be applied to different types of mixing (e.g., linear, non-linear), the MAP ICA algorithm will be described according to a linear mixing of sounds output from a plurality of sources. In such a linear description a vector y (captured sound vector) denotes observed data (e.g., a mixture of the sound captured by a recording device) from the plurality of sources. The observed data y has T components, the components corresponding to T independent observations $y_n$ (components of observed data denoted by subscripts) of the captured sound (e.g., $y=\{y_1, \ldots, y_T\}$). The sound output from respective talkers can be represented by a vector x (source vector), where respective components of the vector x correspond to sound output from one of the plurality of sound sources. In a linear MAP ICA algorithm, the observed data y (e.g., captured sound) is related to an unknown value of the source vector x multiplied by a mixing matrix H (e.g., y=Hx). The mixing matrix H describes how sounds output (e.g., the source vector x) from the plurality of sources mix with each other prior to being captured. For example, if there are two sources, $x_1$ and $x_2$, and a recording device (e.g., microphone) captures an even mixture of sound from both sources, then H is a 2×2 matrix with all values set equal to ½. Therefore, $y_1$ would have a value of $\frac{1}{2}x_1+\frac{1}{2}x_2$ and $y_2$ would have $\frac{1}{2}x_1+\frac{1}{2}x_2$.

Performing MAP ICA is the act of determining the unknown value of the source vector x, comprising a signal from the individual sources. Based on the above linear mixing model, the unknown value of the source vector x can be determined from the observed data y by finding an unmixing matrix W, which is equal to the inverse of the mixing matrix H (e.g., x=Wy). For example, if two people are talking at the same time, a recording device will pick up some combination of both of the two voices mixed by the matrix H. To determine the individual voices the combination of voices must be unmixed by operating on the combination of voices with an unmixing matrix W.

Figure 3:
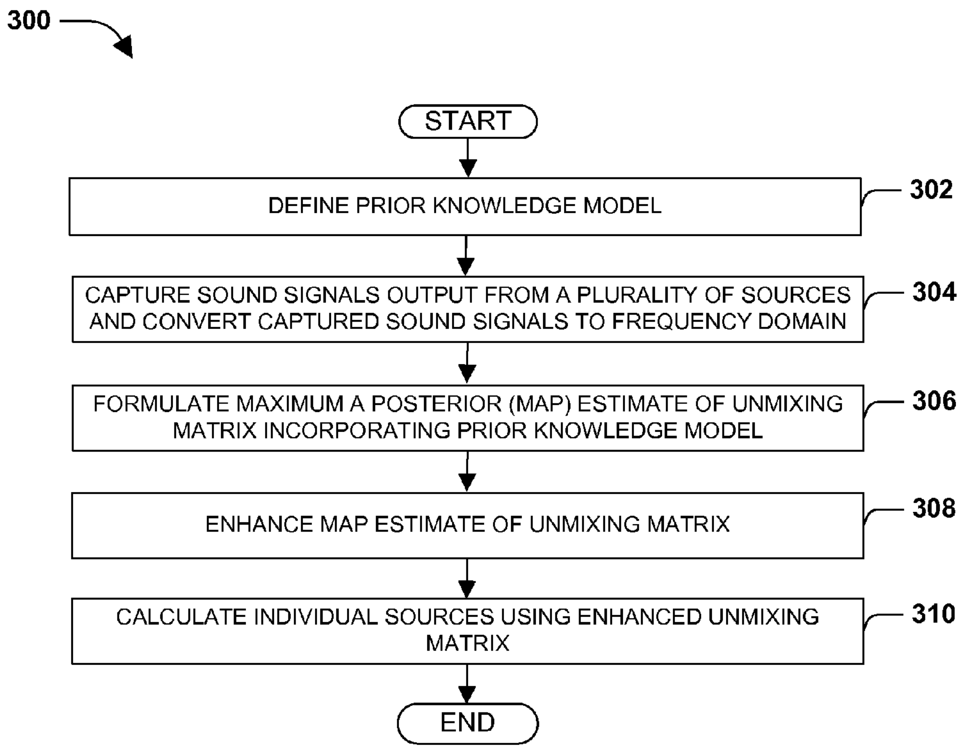
FIG. 3 illustrates a flow chart of an exemplary method of formulating an ICA algorithm that circumvents the permutation problem.
Figure 4:
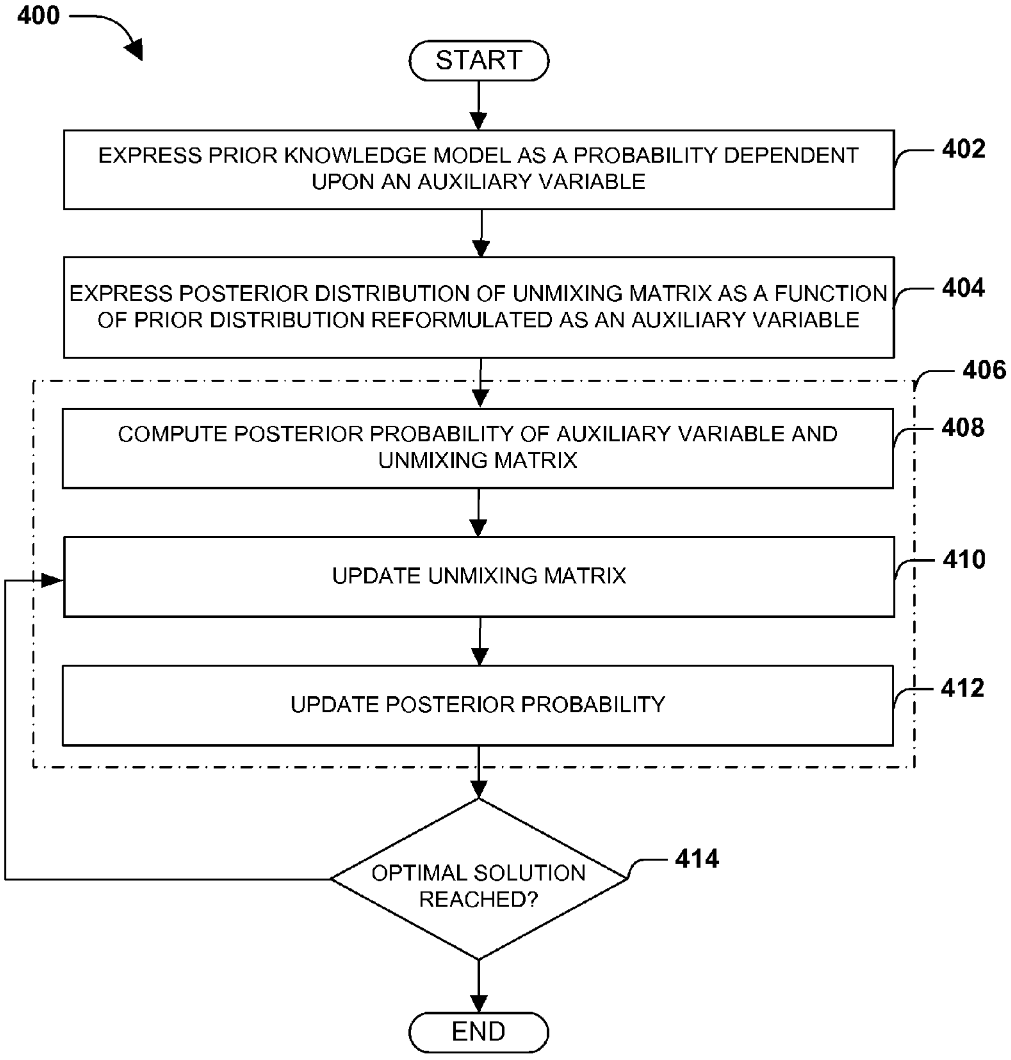
FIG. 4 is a flow chart illustrating an exemplary method of formulating an ICA algorithm that does not suffer from the permutation problem.
Figure 5:
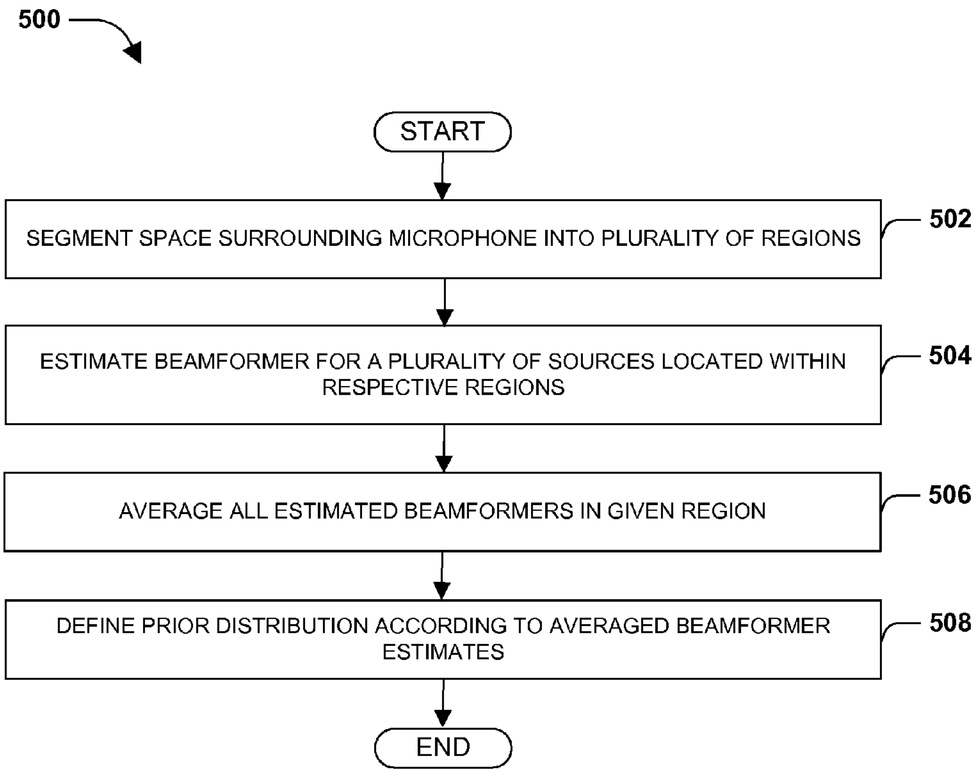
FIG. 5 is a flow chart illustrating an exemplary method of constructing a prior distribution for an unmixing matrix.

FIGS. 3 through 6 show three levels of abstraction for an exemplary MAP ICA algorithm provided herein. FIG. 3 provides a method for formulating a MAP ICA algorithm which incorporates a prior knowledge model (e.g., a prior probability distribution) p(W) (e.g., FIG. 3 provides a method for MAP ICA that depends on a prior knowledge model p(W)). FIG. 4 provides a method for defining a prior knowledge model p(W) according to an auxiliary variable (e.g., FIG. 4 provides a model for p(W) that depends on an auxiliary variable θ). FIG. 5 defines a specific example of a method for defining a specific form of the prior knowledge model p(W/θ) using a beamforming approach (e.g., FIG. 5 provides a specific p(W/θ)). Therefore, the combination of all three levels of abstraction (e.g., methods of FIG. 3, FIG. 4, and FIG. 5) specifically defines all the necessary pieces of a MAP ICA algorithm (e.g., MAP ICA defined according to p(W), a model to define a p(W) dependent on θ, p(θ/W), and a specific form of p(W/θ)). However, it will be appreciated that the specific combination of these three methods is not limiting and each level of abstraction can also be used in conjunction with alternative methods (e.g., an alternative method to the method of FIG. 4 can be used to define a prior knowledge model p(W) to be used in the method of FIG. 3).

FIG. 3 shows a flow chart of an exemplary method for formulating a MAP ICA algorithm according to a prior knowledge model p(W) (e.g., a prior probability distribution). The MAP ICA algorithm of method 300 ensures that the permutation problem does not occur. To achieve this, the MAP ICA algorithm of method 300 determines an unmixing matrix by assuming the underlying captured signal follows a prior knowledge model (e.g., a prior probability distribution) p(W) based on prior knowledge (e.g., of a prior location of sources) and then determining an unmixing matrix W that both agrees with the prior probability distribution p(W), and solves the ICA problem. In other words, an estimate of the unmixing matrix W incorporates prior knowledge (e.g., from a prior experiment) by associating W with a prior knowledge model (e.g., a prior probability distribution) p(W) that explains probable values the elements of the unmixing matrix W can take.

At 302 a prior knowledge model is defined. The prior knowledge model comprises information pertaining to the structure of a proper unmixing matrix. The prior knowledge model p(W) is defined as a probability density over real valued elements of the unmixing matrix according to some prior situation (e.g., a prior distribution of people in a room). The prior knowledge model p(W) may be developed by any number of methods. For example, the prior knowledge model p(W) may be formed from prior information (e.g., prior experiments) regarding the location of the speakers. In a further example discussed below in FIG. 5, the prior knowledge model p(W) is modeled as the joint probability of N independent Gaussian distributions, wherein beamforming is used to determine the parameters defining the Gaussian distributions. In another example, a data driven method is used to determine the prior knowledge model p(W). In the data driven method a prior knowledge model p(W) may be formed by running an ICA algorithm in practice and extracting information from the results. For example, an ICA algorithm can be run 100 times using different people in different places. The results can be recorded and used to build a statistical data driven model.

At 304 sound signals output from a plurality of sources are captured and converted to the frequency domain. One or more recording device(s) (e.g., microphones) can be configured to capture the sound signals. Sound signals captured by the one or more recording device(s) are a mixture of sound from the plurality of sources. Once captured, the sound signals are converted from the time domain to the frequency domain. Conversion to the frequency domain can be performed by means of a mathematical transformation (e.g., Fourier Transform), for example. Conversion to the frequency domain causes the captured signals to be segmented into a plurality of frequency bins (e.g., snapshots of data), each bin comprising signals in a range of frequencies (e.g., a subset of the captured signals frequency range). The MAP ICA algorithm may apply the same optimization strategy for k frequency bins independently, resulting in a separate value of W for respective frequencies. Since respective frequency bins comprise a relatively small amount of data, conversion of the captured sound signals to the frequency domain reduces the computational complexity required to determine the unmixing matrix by reducing the amount of data which must be considered for a calculation.

At 306 a maximum a posteriori (MAP) estimate of the unmixing matrix is calculated incorporating the prior knowledge model. The MAP estimate of the unmixing matrix may be proportional to a posterior distribution p(W|y) which may be expressed as the product of the prior knowledge model p(W) and a likelihood distribution p(y|W) (e.g., joint density) of the observed data y and the unmixing matrix W. For example, the MAP estimate of the unmixing matrix can be written as:

$$W_{MAP} = \underset{W}{\operatorname{argmax}} p(W \mid y) = \underset{W}{\operatorname{argmax}} p(y \mid W) p(W)$$

where argmax finds the argument of the maximum of the function (e.g., p(y|W)p(W)). In MAP ICA, the posterior distribution, p(W|y), decomposes into the product of two terms, the likelihood distribution, p(y|W), and the prior distribution, p(W). In the likelihood distribution term both the observed data y and the unmixing matrix Ware random variables. The addition of the second term p(W) constrains the MAP estimate of the unmixing matrix to agree with the prior knowledge model.

The MAP estimate of the unmixing matrix is then enhanced (e.g., maximized) at 308. Enhancement of the MAP estimate of the unmixing matrix $W_{MAP}$ is performed by application of an optimization algorithm. Enhancement provides an unmixing matrix W that both separates sources via the ICA algorithm and agrees with the prior knowledge model. Enhancement of $W_{MAP}$ can be performed, for example, by finding a log likelihood function of $W_{MAP}$ and then taking the derivative of the log likelihood function with respect to W, thereby resulting in an expression for the derivative of the enhanced MAP estimate of the unmixing matrix. A gradient descent algorithm can be subsequently performed on the log likelihood function to arrive at an enhanced (e.g., optimal) value for the unmixing matrix. For example, the gradient of the log likelihood function of the unmixing matrix W may be set equal to:

$$\Delta W \alpha (W^{-1})^T + \frac{1}{T}\sum_t g(Wy_t)y_t^H + \frac{1}{T}h(W)$$

where T is the amount of data, $$g(x) = \frac{p'(x)}{p(x)}, \text{ and } h(W) = \frac{p'(W)}{p(W)}$$

reflects the prior knowledge. The role of the prior knowledge changes as a function of the amount of observed data T (e.g., amount of sound captured). As T grows larger the prior knowledge plays a decreasingly important role in the unmixing matrix calculation. The resultant change in the unmixing matrix ΔW, provides an estimate of the unmixing matrix due that is dependent upon the incorporation of prior knowledge as h(W).

The change in the unmixing matrix ΔW computed according to method 300 allows the use of an iterative approach to the determining the unmixing matrix. For example, if $W_{curr}$ is a current value (e.g., an initial guess) of the unmixing matrix and $W_{new}$ is the updated value, $W_{new}=W_{curr}+\mu\Delta W$, where ΔW is the gradient of the log likelihood function with respect to the unmixing matrix W and μ is a learning rate that controls how fast the unmixing matrix adapts. At the next iteration, $W_{new}$ becomes the $W_{curr}$, and then $W_{new}$ is updated with a new value. This iterative process continues until the value of $W_{new}$ doesn't change much from the value of $W_{curr}$ and a solution is converged upon. Alternatively, the iterative approach could be run for a fixed number of iterations.

At 310 the enhanced unmixing matrix $W_{new}$ is used to calculate the sound output from an individual source. The enhanced unmixing matrix $W_{new}$ is applied to the observed data y comprising the captured sound resulting in the source vector x comprising the sound output from respective individual sources.

FIG. 4 shows a flow chart of an exemplary method of constructing a prior knowledge model p(W). In the method 400, the prior knowledge model is defined according to an auxiliary variable Θ related to the location of sources in a room (e.g., given knowledge of the location of the sources, there is knowledge of W). More particularly, the prior knowledge model p(W) provides a prior distribution based upon an auxiliary variable Θ that connects unmixing matrices across frequency bins (e.g., across frequencies ω) in such a manner as to prevent the occurrence of the permutation problem.

At 402 the prior knowledge model (e.g., prior probability distribution) is expressed as a probability dependent upon an auxiliary variable. The auxiliary variable ⊕ may be related to the location of sources with respect to a recording device (e.g., microphone). The location of the sources (e.g., represented by an angle ⊕) relative to the recording device provides information about a prior unmixing matrix. For example, for a microphone configured to define straight ahead as 0°, if a first speaker is at 30° and a second speaker is at 40° a prior knowledge model can be determined. In one particular example, the prior distribution p(W) can be described as:

$$p(W) = \sum_\theta \prod_\omega p(W(\omega) \mid \theta)p(\theta)$$

where $\Theta=\{\theta_1, \ldots, \theta_N\}$ is the location of N sources relative to the microphone. In this example p(W(ω)|Θ) is a function of the frequency ω. If it is assumed all frequency bins are independent, then the distributions are different for different frequencies. The product of the distributions p(W(ω)Θ) associated with different frequency bins is connected by summing over the auxiliary variable. Considering p(W|Θ) over all ⊕ (e.g., from $\theta_i$ to $\theta_N$) describes the direction of respective sources within the plurality of sources.

At 404 the posterior distribution of the unmixing matrix is expressed as a function of the auxiliary variable by incorporating the prior distribution reformulated as a function of the auxiliary variable. As consequence, the posterior distribution p(W|y) (e.g., FIG. 3, element 306) can be described as:

$$p(w|y) \propto p(y|W)\sum_\theta p(W, \theta)$$

where Bayes rule (e.g., as is well known in the art, Bayes rule changes an expression for the probability of B given A to an expression for the probability of A given B) has been applied. Summation of p(W, Θ) over all 0 (marginalization) effectively eliminates Θ from the equation and therefore p(W, Θ) marginalized becomes the prior knowledge model p(W). For the sake of this method 400 it is assumed that p(W, Θ)=p(W) is known.

The posterior distribution of the unmixing matrix is then enhanced (process shown as 406) by an iterative process comprising acts 408-414. Enhancement of the posterior distribution p(W|y) can be performed by taking a log likelihood function of the posterior distribution p(W|y) and then taking the derivative of the log likelihood function with respect to W. The resultant equation comprises a term representing the contribution of the prior knowledge to a MAP ICA algorithm (e.g., is analogous to h(W)) based upon the auxiliary variable. For example, the term representing the prior knowledge may equal:

$$\frac{\partial}{\partial W}\log\sum_{\theta} p(w,\theta) = \sum_{\theta} p(\theta \mid W)\sum_{\omega} \frac{\partial y}{\partial W(\omega)}\log(p(W(\omega) \mid \theta)).$$

This equation is analogous to h(W) and therefore provides an expression by which the unmixing matrix can be determined.

At 408 a posterior probability of the auxiliary variable and the unmixing matrix is computed. The posterior probability p(Θ|W) is computed from the prior distribution of W over all frequency bins. In the log likelihood equation the posterior probability p(Θ|W) is unknown, but using Bayes rule, it can be formulated in terms of known quantities:

$$p(\theta \mid W) = \frac{\prod_{\omega} p(W(\omega) \mid \theta)p(\theta)}{\sum_{\theta'} \prod_{\omega} p(W(\omega) \mid \theta)p(\theta)}$$

where it is assumed that the probability of W given Θ (e.g., p(W|Θ)) is known. This equation provides an expression by which the posterior probability p(Θ|W) can be determined Once the posterior probability is computed expressions exist for determining the unmixing matrix Wand the posterior probability p(Θ|W) and method 300 can be utilized to perform MAP ICA as shown in the method of FIG. 3. In particular, for a given posterior probability p(Θ|W) the value of the unmixing matrix W can be updated to get $W_{new}$ (e.g., FIG. 4, element 410). Then, the new estimate of the unmixing matrix $W_{new}$ can be used to update the posterior probability $p(\Theta|W)_{new}$. These two acts may be iteratively repeated until to optimize both the posterior probability $p(\Theta|W)_{new}$ and the unmixing matrix $W_{new}$ until an optimal solution is arrived at.

FIG. 5 shows a flow chart of an exemplary method 500 for defining a specific form of a prior knowledge model p(W/θ). In particular, method 500 describes a prior knowledge model p(W/θ) as a joint probability of plurality of Gaussian distributions. Beamformers provide information about sources (e.g., forming a prior knowledge) which can be used for characterizing the Gaussian distributions (e.g., defining the variables of the distribution). For example, if a situation is going to be used as prior knowledge, beamformers can be used to gather information about the situation. The information gathered by the beamformers is then used to defining the variables of a plurality of Gaussian distribution used to form the prior knowledge model. Method 500 is described below in more detail in relation to FIG. 6, a graphical representation of the random beamformers for a given a region of space.

Figure 6:
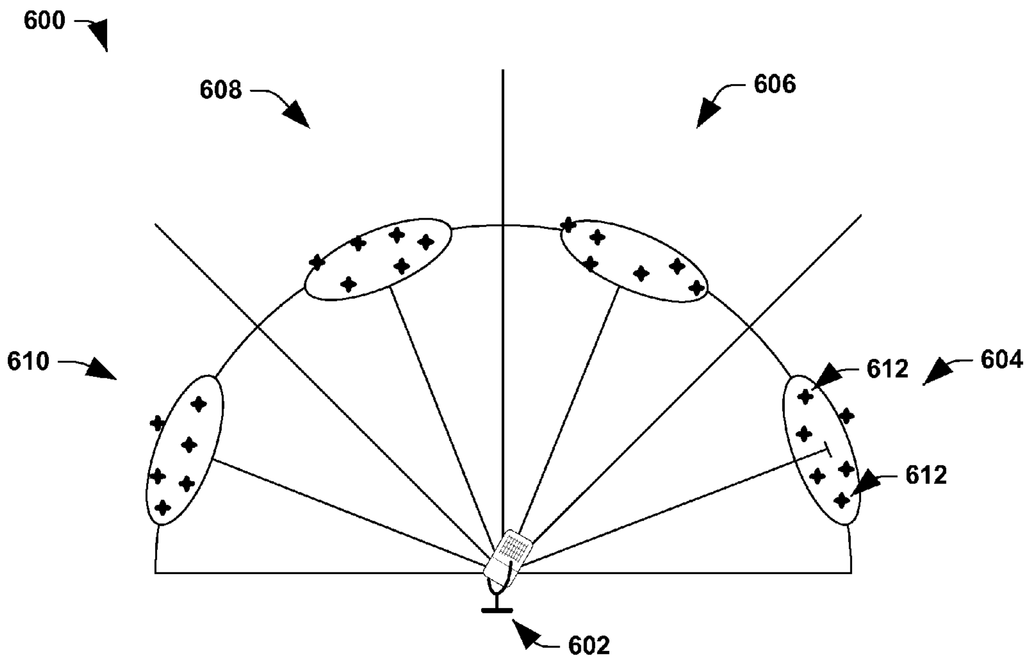
FIG. 6 is a flow chart illustrating an exemplary method of defining a prior knowledge model used to form a maximum a posteriori (MAP) estimate of an unmixing matrix.

At 502 the space surrounding a recording device (e.g., microphone) is segmented into a plurality of regions. FIG. 6 illustrates a 180° region surrounding a recording device 602 segmented into four regions 604, 606, 608, 610. In FIG. 6, the four regions 604, 606, 608, 610 are illustrated as being 45° wide. However, regions can be defined according to a user's preference and can be smaller (e.g., 1°) or larger (e.g., 60°) than the regions illustrated in FIG. 6.

At 504 a beamformer (e.g., ideal beamformer) is estimated for a plurality of sources located within respective regions. The sources' locations may be chosen randomly throughout a given region. FIG. 6 illustrates regions comprising a plurality of randomly chosen locations 612, respective locations 612 associated with a different angle and a different distance relative to the recording device 602. For respective locations 612, the appropriate beamformer can be directly computed. Computation of the beamformers is not described in this application as it is beyond the scope of the application.

At 506 the estimated beamformers in a given region are averaged together to come up with an average beamformer. Information pertaining to the average beamformer can be used to form a prior knowledge model for an associated region. Since an average over a given region is used uncertainty in the direction of captured sound is allowed for.

At 508 the prior knowledge model is defined according to the averaged beamformer estimates. More particularly, the prior knowledge model may be defined as a joint probability of N independent multivariate Gaussian sources given as:

$$p(w(\omega) \mid \theta) = \prod_{i=1}^{N} p(w_i(\omega) \mid \theta_i) = \prod_{i=1}^{N} N\left(w_i(\omega); \mu_{\theta_i}(\omega), \sum_{\theta_i}(\omega)\right)$$

where $\theta_1$ denotes a specitic direction in a given region of space, $w_i$ is a row of the unmixing matrix W, $\mu_{\theta_i}$ is the mean of the Gaussian distribution, and $\Sigma_{74_i}$ is the covariance of the Gaussian distribution. The mean and the covariance of the Gaussian distributions are determined from the beamformer estimates for respective regions. Respective rows of the joint probability function p(W((ω)|Θ) correspond to a different source (e.g., different direction) denoted with a subscript i. For example, the mean and the covariance of a given region correspond to $\mu_{\theta_i}$ and $\Sigma_{\theta_i}$ for a given i (or range of i). Therefore, the resultant probability density is the product variables defining a Gaussian distribution over N different directions. Once the prior knowledge model is defined all components to run the MAP ICA algorithm are present.

Figure 7:
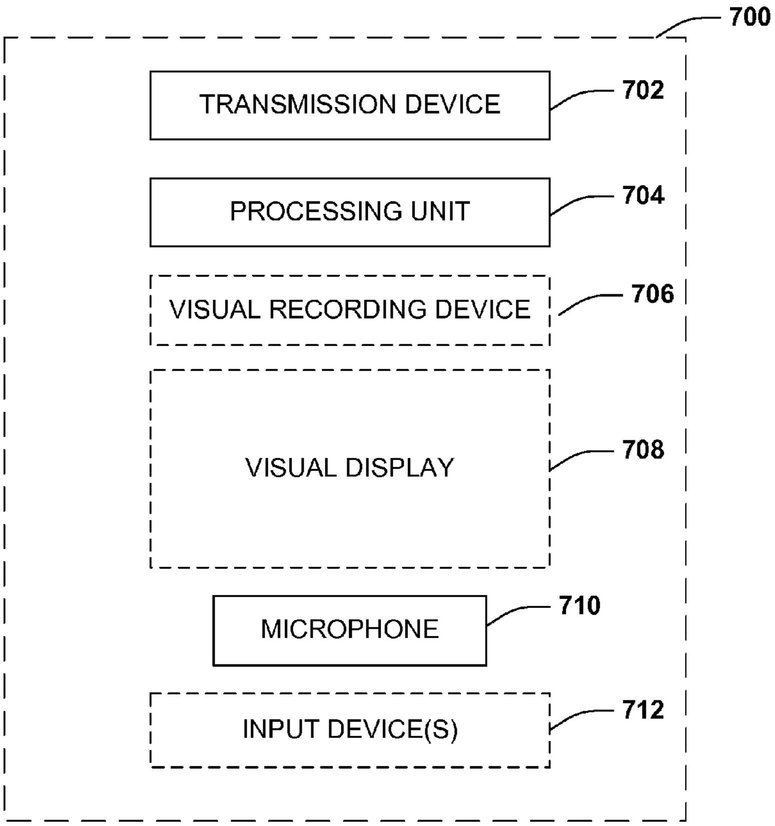
FIG. 7 illustrates a block diagram of a communication system utilizing a speaker array as provided herein.

It will be appreciated that the techniques and methods provided herein can be applied to a wide variety of applications. For example, FIG. 7 illustrates a block diagram illustrating a communications system 700 utilizing the MAP ICA algorithm (performed by a processing unit 704) as provided herein. In its simplest form, the communication system of FIG. 7 comprises a microphone 710 to receive a voice communication from a user, a transmission device 702 to facilitate communication with others, and a processing unit 704 configured to perform a MAP ICA algorithm as provided herein. The communication system 700 will utilize MAP ICA algorithm to improve the quality of captured sound. In one embodiment, the processing unit 704, the transmission device 702, and the recording device 710 are commonly housed within a communication device (e.g., telephone, speakerphone, computer, teleconferencing system). In an alternative communication system, FIG. 7 may optionally further comprise one or more of a visual display unit 708 (e.g., computer monitor), a visual recording device 706 (e.g., webcam), and/or one or more input device(s) (e.g., keyboard, mouse). The visual display 708 and the visual recording device 706 provide a means to concurrently communicate visually and verbally.

Figure 8:
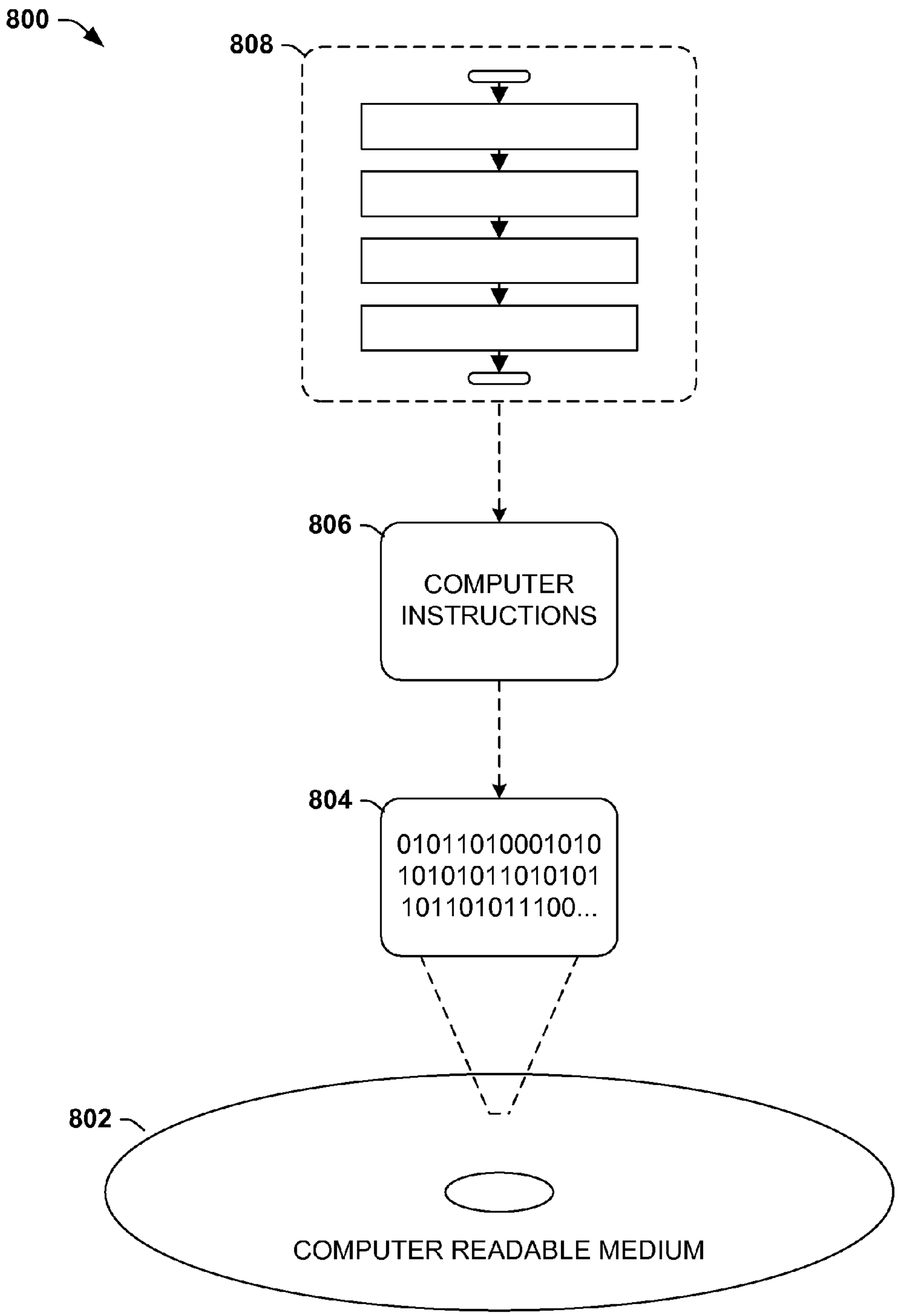
FIG. 8 is an illustration of an exemplary computer-readable medium comprising processor-executable instructions configured to embody one or more of the provisions set forth herein.

Still another embodiment involves a computer-readable medium comprising processor-executable instructions configured to apply one or more of the techniques presented herein. An exemplary computer-readable medium that may be devised in these ways is illustrated in FIG. 8, wherein the implementation 800 comprises a computer-readable medium 802 (e.g., a CD-R, DVD-R, or a platter of a hard disk drive), on which is encoded computer-readable data 804. This computer-readable data 804 in turn comprises a set of computer instructions 806 configured to operate according to one or more of the principles set forth herein. In one such embodiment, the processor-executable instructions 806 may be configured to perform a method of 808, such as the exemplary method 800 of FIG. 8, for example. In another such embodiment, the processor-executable instructions 806 may be configured to implement a system configured to provide a sound quality on-par with existing ICA systems is provided while avoiding an expensive post-processing step (e.g., perform MAP ICA as provided herein). Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
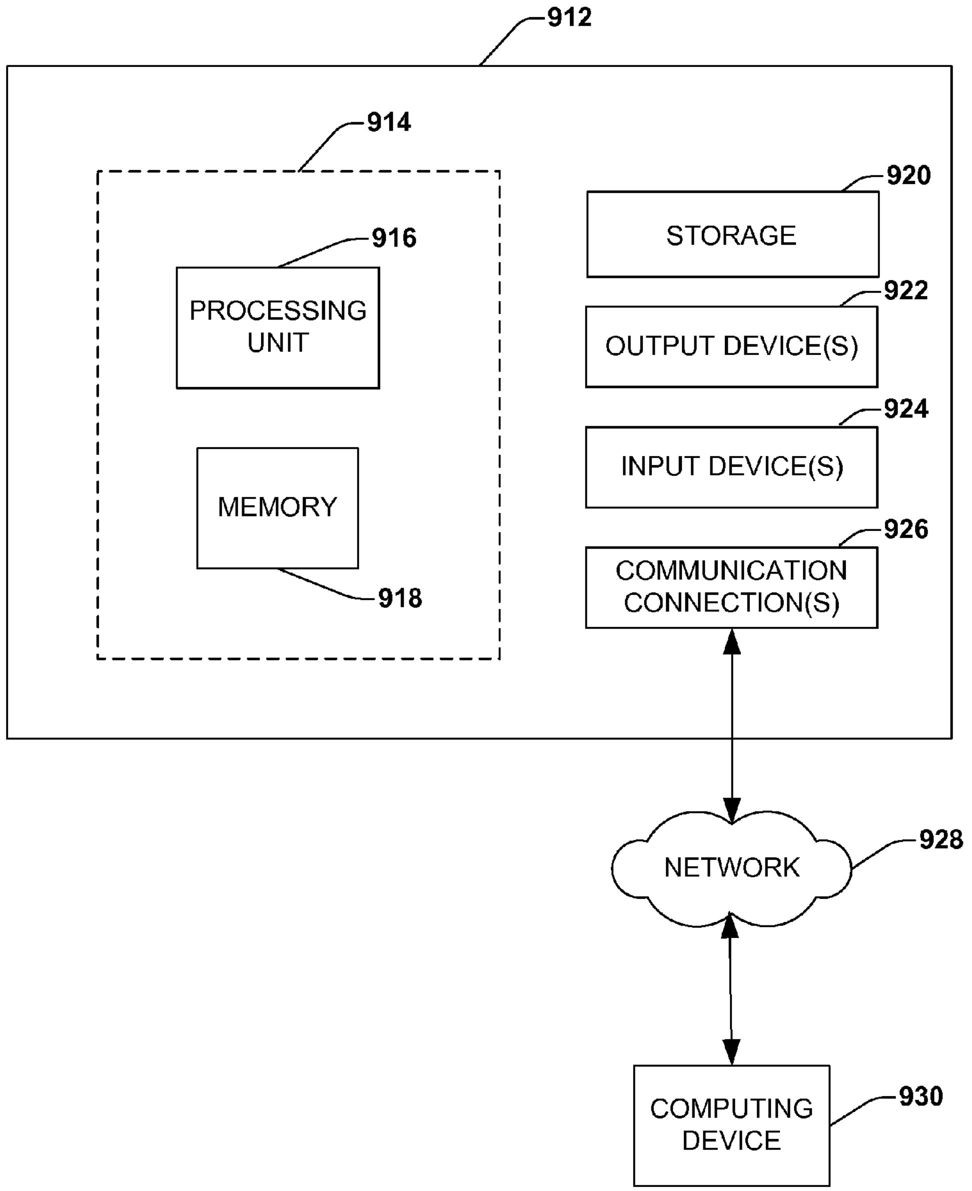
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, sources, printers, and/or any other output device may also be included in device 912. Input device(s) 924 and output device(s) 922 may be connected to device 912 via a wired connection, wireless connection, or any combination thereof.

In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:

formulating a maximum a posteriori (MAP) Independent Component Analysis (ICA) estimate of an unmixing matrix, a structure of the unmixing matrix incorporating prior knowledge regarding at least one of a distribution of sources in a sound capturing environment or a location of sources relative to one or more recording devices in the sound capturing environment; and unmixing one or more signals derived from one or more sounds captured in the sound capturing environment based at least in part upon the MAP ICA estimate.

2. The method of claim 1, at least some of the one or more signals indicative of a mixture of sounds output from a plurality of sources.

3. The method of claim 1, the MAP ICA estimate expressed as a posterior distribution which can be expressed as an argument of a maximum of a prior knowledge model comprising information pertaining to the structure of the unmixing matrix and a likelihood distribution of observed data and the unmixing matrix.

4. The method of claim 3, the prior knowledge model comprising a prior probability distribution.

5. The method of claim 1, comprising applying an optimization algorithm to the MAP ICA estimate to generate an enhanced MAP ICA estimate of the unmixing matrix.

6. The method of claim 5, applying the optimization algorithm comprising:

formulating a log likelihood function of the MAP ICA estimate;

taking a derivative of the log likelihood function with respect to the unmixing matrix; and performing gradient descent on the derivative of the log likelihood function.

7. The method of claim 1, comprising decreasing an influence of prior knowledge in the MAP ICA estimate as an amount of observed data increases.

8. The method of claim 1, comprising defining a prior knowledge model comprising information pertaining to the structure of the unmixing matrix, the defining comprising:

expressing the prior knowledge model as a probability distribution dependent upon an auxiliary variable;

reformulating the MAP ICA estimate of the unmixing matrix as a function of the auxiliary variable by rewriting a posterior distribution as a function of the auxiliary variable;

forming a log likelihood function of the rewritten posterior distribution and taking a derivative of the log likelihood function with respect to the unmixing matrix; and calculating a posterior probability from the derivative of the log likelihood function of the rewritten posterior distribution.

9. The method of claim 8, the auxiliary variable comprising a direction from which a sound arrives at a recording device.

10. The method of claim 8, the posterior probability and the unmixing matrix iteratively updated until a desired solution is identified.

11. The method of claim 1, comprising defining a prior knowledge model comprising information pertaining to the structure of the unmixing matrix, the defining comprising computing beamformers.

12. The method of claim 11, computing beamformers comprising:

segmenting a space surrounding a recording device into a plurality of regions, respective regions comprising multiple sources;

sampling at least some of the multiple sources located within respective regions;

estimating a beamformer for respective sampled sources;

averaging beamformers of respective sampled sources within respective regions; and defining the prior knowledge model according to at least some of the averaged beamformers.

13. A system, comprising:

a formulation component configured to formulate a maximum a posteriori (MAP) Independent Component Analysis (ICA) estimate of an unmixing matrix based at least in part upon prior knowledge regarding at least one of a distribution of sources in a sound capturing environment or a location of sources relative to one or more recording devices in the sound capturing environment; and an unmixing component configured to unmix one or more signals derived from one or more sounds captured in the sound capturing environment based at least in part upon the MAP ICA estimate.

14. The system of claim 13, at least some of the one or more signals indicative of a mixture of sounds output from a plurality of sources.

15. The system of claim 13, the formulation component configure to express the MAP ICA estimate as a posterior distribution, which can be expressed as an argument of a maximum of a prior knowledge model comprising information pertaining to a structure of the unmixing matrix and a likelihood distribution of observed data and the unmixing matrix.

16. The system of claim 15, the prior knowledge model comprising a prior probability distribution.

17. The system of claim 13, comprising an optimization component configured to apply an optimization algorithm to the MAP ICA estimate to generate an enhanced MAP ICA estimate of the unmixing matrix.

18. The system of claim 17, the optimization component configured to apply the optimization algorithm by:

formulating a log likelihood function of the MAP ICA estimate;

taking a derivative of the log likelihood function with respect to the unmixing matrix; and performing gradient descent on the derivative of the log likelihood function.

19. The system of claim 13, the sound capturing environment comprising at least one of a teleconferencing environment or a video conferencing environment.

20. A tangible computer readable storage device comprising computer executable instructions that when executed via a processor perform a method, the method comprising:

formulating a maximum a posteriori (MAP) Independent Component Analysis (ICA) estimate of an unmixing matrix based at least in part upon prior knowledge regarding at least one of a distribution of sources in a sound capturing environment or a location of sources relative to one or more recording devices in the sound capturing environment; and using the MAP ICA estimate to unmix one or more signals derived from one or more sounds captured in the sound capturing environment.

* * * * *